(12) United States Patent
Kaaja et al.

(10) Patent No.: US 8,116,694 B2
(45) Date of Patent: Feb. 14, 2012

(54) SYSTEM FOR FACILITATING BEAM TRAINING

(75) Inventors: Harald Kaaja, Järvenpää (FI); Mika Kasslin, Espoo (FI); Tuomas Laine, Vantaa (FI)

(73) Assignee: Nokia Corporation, Espoo (FI)

( * ) Notice: Subject to any disclaimer, the term of this patent is extended or adjusted under 35 U.S.C. 154(b) by 567 days.

(21) Appl. No.: 12/343,098

(22) Filed: Dec. 23, 2008

(65) Prior Publication Data
US 2010/0159845 A1    Jun. 24, 2010

(51) Int. Cl.
*H04B 7/00*    (2006.01)
(52) U.S. Cl. ......................................... 455/70; 455/41.2
(58) Field of Classification Search .................... 455/70, 455/41.2, 41.3, 67.11, 67.13, 67.14, 435.1, 455/435.2, 435.3, 552.1, 553.1, 63.4, 561, 455/562.1, 507; 370/328, 314, 320, 342
See application file for complete search history.

(56) References Cited

U.S. PATENT DOCUMENTS
2002/0013149 A1*   1/2002   Threadgill et al. ............ 455/427

FOREIGN PATENT DOCUMENTS
WO    2006/031495    3/2006
* cited by examiner

*Primary Examiner* — Joseph Lauture
(74) *Attorney, Agent, or Firm* — Locke Lord LLP

(57) ABSTRACT

A system for configuring antenna systems for selecting directional communication signals corresponding to other apparatuses. Apparatuses having activities that require directional wireless communication may search for other apparatuses that can fulfill these requirements. This search may include, for example, the transmission of wireless messages requesting a set of communication beams usable for beam training (for example, one or more beam training sequences). Other apparatuses that are able to satisfy the requirements of the searching apparatus may respond to the request message by transmitting a message that comprises at least information usable for configuring beam training configuration in the apparatus.

20 Claims, 9 Drawing Sheets

SYSTEM FOR FACILITATING BEAM TRAINING

BACKGROUND

1. Field of Invention

Various example embodiments of the present invention relate to wireless communication, and in particular, to systems for configuring directionally-focused wireless communication in an apparatus using signals provided by other apparatuses.

2. Background

Recent interest in the development of very high-speed wireless networks for short range communication has been fueled by the increase in emerging broadband applications such as a wireless high-definition multimedia interface (HDMI), gaming interfaces, high-speed backhaul, content distribution services, or the like. The 60 GHz millimeter band (mmWave) has been targeted for the implementation of such high speed and/or capacity wireless networks due to the worldwide availability of huge unlicensed spectrum in this band.

However, there are many challenges to implementing an architecture in the mmWave band. For example, potential radio designs will be impacted by link budget constraints. In particular, compared to lower frequency band systems, the coverage range in the mmWave band is severely limited by very high free space propagation loss, higher penetration, reflection and scattering losses and atmospheric oxygen absorption that will be experienced by communication carrier waves operating within this spectrum.

Greater sensitivity to environmental influences may impact the operational efficiency of communication in the mmWave band. Overall wireless signal quality may suffer (for example, unstable connections and lost packet retransmission may noticeably impact communication performance, as well as other systems relying upon these resources), and therefore, any capacity benefits that could be realized by operating in the 60 GHz band may therefore be somewhat nullified by poor communication performance. At least the above operational impediments should be overcome before wireless communication in the mmWave band will be deemed robust enough for mainstream use.

SUMMARY

Example implementations of the present invention, in accordance with various embodiments, may be directed to at least a process, computer program, apparatus and system for configuring direction-specific wireless communication in apparatuses. For example, activities that occur in apparatuses may create requirements for wireless communication. Some of these requirements may be satisfied by particular modes of wireless communication that benefit (for example, experience improved QoS) from aiming the communication signal in a particular direction, such as in a direction towards an apparatus with which communication is desired. In order to aim these communication signals, or beams, the direction towards the apparatus with which communication is desired must be defined. In particular, a "beam training" process may define a preferred communication beam by determining a direction of arrival for signals transmitted from other apparatuses.

In accordance with at least one example embodiment of the present invention, apparatuses having activities that require directional wireless communication may search for other apparatuses that can fulfill these requirements. This search may include, for example, the transmission of wireless messages requesting a set of communication beams usable for beam training (for example, one or more beam training sequences). Other apparatuses that are able to satisfy the requirements of the searching apparatus may respond to the request message by transmitting a message that comprises at least information usable for configuring beam training configuration in the apparatus.

For example, the beam training configuration information may indicate that an abbreviated or reduced set of beam training sequences are being sent. A reduced set of beam training sequences may be used in certain situations, such as when the other apparatus can determine the direction of arrival of the request message sent from the searching apparatus. In at least one example implementation of the present invention, a determination may be made regarding whether a direction of arrival estimation may be performed using the request message (for example, does the request message satisfies a quality threshold). If a direction of arrival estimation can be performed, the other apparatus initiate a focused beam training procedure including, for example, a reduced set of directional training beams. Otherwise a complete set of directional training may be used (for example, in all directions supported the responding apparatus).

Once the type of beam training has been established, a response message may be formulated including at least beam training configuration information. This message may be transmitted to the searching apparatus, which uses the beam training configuration information to enter a mode appropriate for the particular type of beam training. The beam training (reduced or complete set of beams) may then proceed in accordance with the configuration information. Upon completion of beam training, the searching apparatus may transmit a signaling message to the other apparatus, wherein the signaling message includes the identification of at least one preferred beam.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

Various example embodiments of the present invention may be understood from the following detailed description and example implementations taken in conjunction with the appended drawings, wherein.

DESCRIPTION OF EXAMPLE EMBODIMENTS

While the present invention has been described below embodied in terms of one or more implementation examples, various changes can be made therein without departing from the spirit and scope of the invention, as described in the appended claims.

I. Interaction Scenario

To overcome potentially huge path losses that may be experienced when implementing, for example, a 60 GHz radio architecture, beamforming techniques for adjusting multi-element antenna systems at both the transmission and reception sides may become important. In many channel environments, the lack of significant scattering or richness in multipath operation may reduce the applicability of traditional multiple input-multiple output (MIMO) spatial multiplexing schemes in an effort to increase the spectral efficiency. As a result, simple beamforming techniques with the objective of transmitting and receiving towards the best beam-direction in order to maximize the signal to noise ratio (SNR) for single spatial data stream may be required. Given the much smaller wavelength (for example, 5 mm for 60 GHz) in this band, a substantial number of antenna elements can be constructed in a relatively small area that can further be integrated with other RF components in the RF front-end. To extend the range of coverage, these antenna systems may be equipped with beam steering capability to focus upon the best direction of transmission and reception.

Figure 1A:
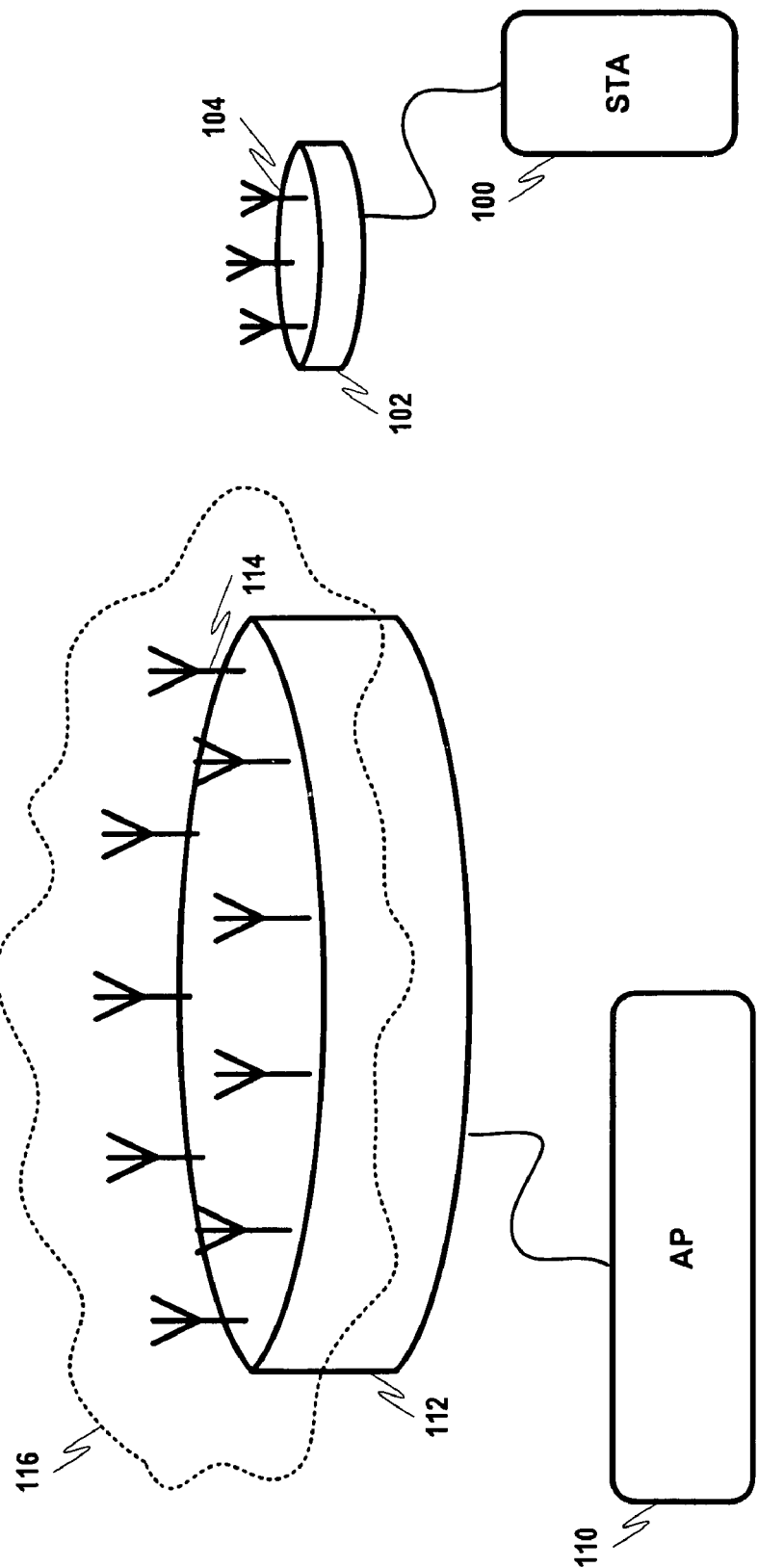
FIG. 1A discloses examples of apparatuses interacting via wireless communication in accordance with at least one embodiment of the present invention.

FIG. 1A discloses an example comprising two apparatuses that will be utilized herein to explain various example implementations of the present invention. While two devices including access point (AP) 110 and station (STA) 100 are shown in FIG. 1A, the different embodiments of the present invention are not specifically limited to this configuration, and may be applied in scenarios wherein more devices are interacting. Furthermore, situations may also exist where one of the apparatuses takes the role of AP only temporarily, for example, in an ad-hoc networking environment where the roles of the participating apparatuses are constantly changing. In addition, AP 110 and STA 100 are shown coupled to external antenna systems 112 and 102, respectively. While these antenna systems have been shown as entities separate from each apparatus, this representation has been used merely to facilitate the disclosure of the various embodiments of the present invention. As set forth above, antenna systems for use in, for example, the 60 GHz band may also be implemented in a more compact configuration (for example, as part of a integrated circuit or chipset) that may incorporated within each apparatus.

Each antenna system may include a plurality of antennas (for example, shown at 114 and 104). The number of antennas in an antenna system may depend on the characteristics of an apparatus. For example, restrictions in apparatus size, power, processing, or the like may dictate the number of antennas that can be supported in an apparatus. Some or all of the antennas 114 and 104 in antenna systems 112 and 102 may be active at any given time, which may result in a communication signal, represented for example in FIG. 1A at 116. In the configuration shown in FIG. 1A, signal 116 is operating in a multidirectional mode. There may also be instances where the antenna system may comprise, for example, a switched set of directional fixed-beam antennas.

Figure 1B:
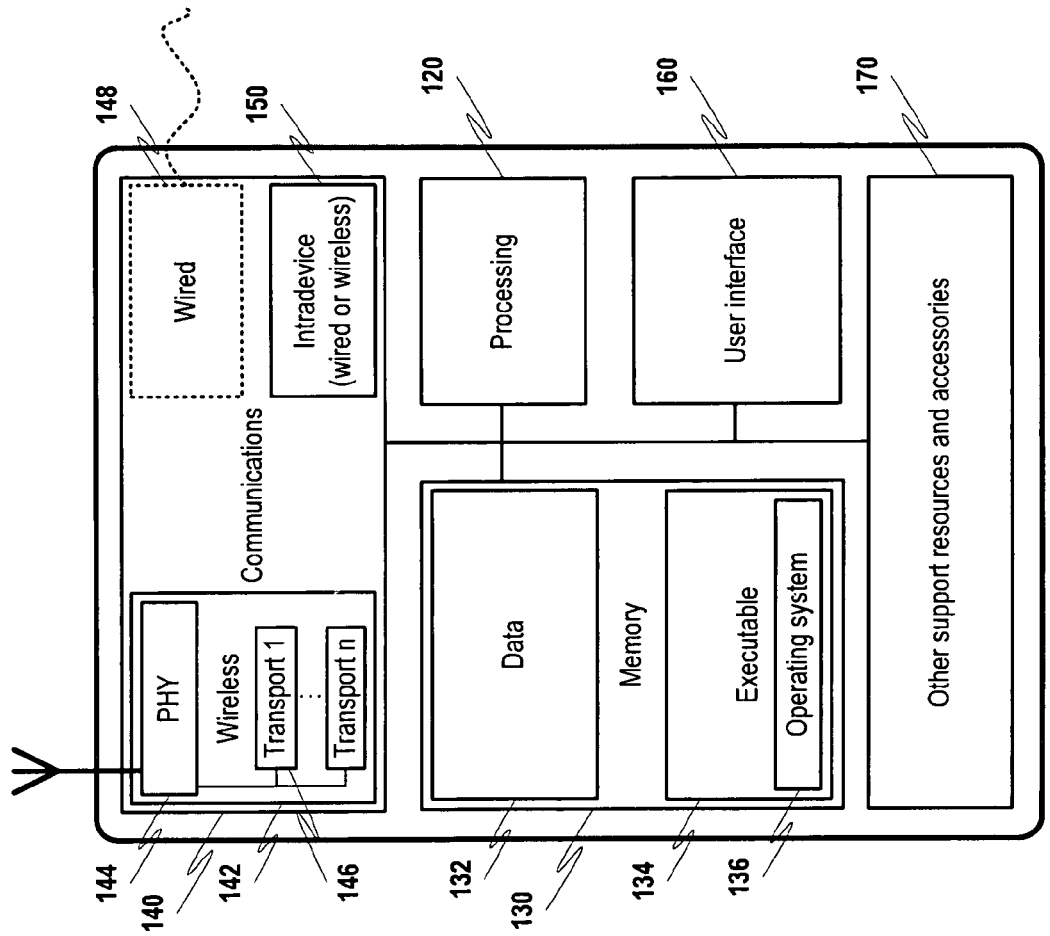
FIG. 1B discloses an example of a functional layout corresponding to the apparatuses previously described in FIG. 1A.

Now referring to FIG. 1B, an example device configuration in accordance with at least one embodiment of the present invention is disclosed. For instance, the basic layout disclosed in FIG. 1B may be applied to one or both of the example apparatuses disclosed in FIG. 1A. Processing section 120 may comprise one or more data processing components such as microprocessors, microcontrollers, discrete logic circuits, field-programmable gate arrays (FPGA), or the like. Processing section 120 may be configured to perform various activities in an apparatus, including operations utilizing input data, yielding output data, triggering actions in the apparatus, and/or the like These operations may include, but are not limited to, arithmetic manipulation, conversion, compilation, interpretation, or the like Information used in, and created by, these activities may be stored in memory 130, which may communicate with processing section 120 via wired or wireless a communication bus.

Memory section 130 may incorporate different types of static or dynamic memory. For example, read-only-memories (ROM) and random access memories (RAM) may be made up of components from an array of available technologies such as magnetic, optical and electronic memory mediums. Memory components may further be fixed in an apparatus, or may be removable from the device in order to support data storage, loading, transfer, backup, and/or the like The types of information that may be stored in memory 130 may include at least data 132 and executable 134. The types of information in data 132 may include databases, text, audio and/or video (for example, multimedia), and/or the like. Processing section 120 may utilize executable information 134 for carrying out various activities in an apparatus, including operations using data 132. For instance, operating system 136 may comprise at least one executable program configured to provide baseline operation for the apparatus.

In at least one example implementation, processing section 120 may access information stored in memory 130 when interacting with communications section 140, which may comprise at least wireless support 144 and intra-device support 150. Wireless support 140 may include resources corresponding to one or more wireless transports 142 that may access resources in physical layer (PHY) 144, such as an antenna or antenna system and corresponding support hardware, in order to communicate wirelessly with other apparatuses. Intra-device support 150 may include wired and/or wireless resources for conveying data between different sections of the apparatus. Communications 140 may optionally include resources corresponding to other forms of communication, such as wired communication support 148. Wired support 148 may comprise, for example, any hardware and/or software required for coupling to a wired communication medium.

Apparatuses usable with various example embodiments of the present invention may further include user interface functionality 160, as well as other support resources and accessories 170, depending on the configuration of a particular apparatus, the use for which an apparatus is intended, and/or the like. For example, AP 110 may not necessarily require extensive user interface functionality, but may include features such as battery backup, security features, and/or the like. On the other hand, portable wireless devices may require a more extensive user interface (for example, including displays, keypads, speakers, pointing devices, microphones, and/or the like) as well as other resources related to desired user functionality.

II. Beam Forming

In the mmWave band, multiple stations may utilize beamforming to extend their range. The approach described with respect to various embodiments of the present invention may provide efficient solutions to training overhead by asymmetrically providing the possibility for beam-selection training facilitated by apparatuses acting in an AP role while still supporting beam-steered transmissions under carrier sense access with collision avoidance (CSMA/CA) medium access. Such beam steering schemes may utilize physical layer protocol data units (PPDUs) for performing beam training with stations in a basic service set (BSS) so that the stations can steer their signals to the right direction while communicating to the AP.

Figure 2:
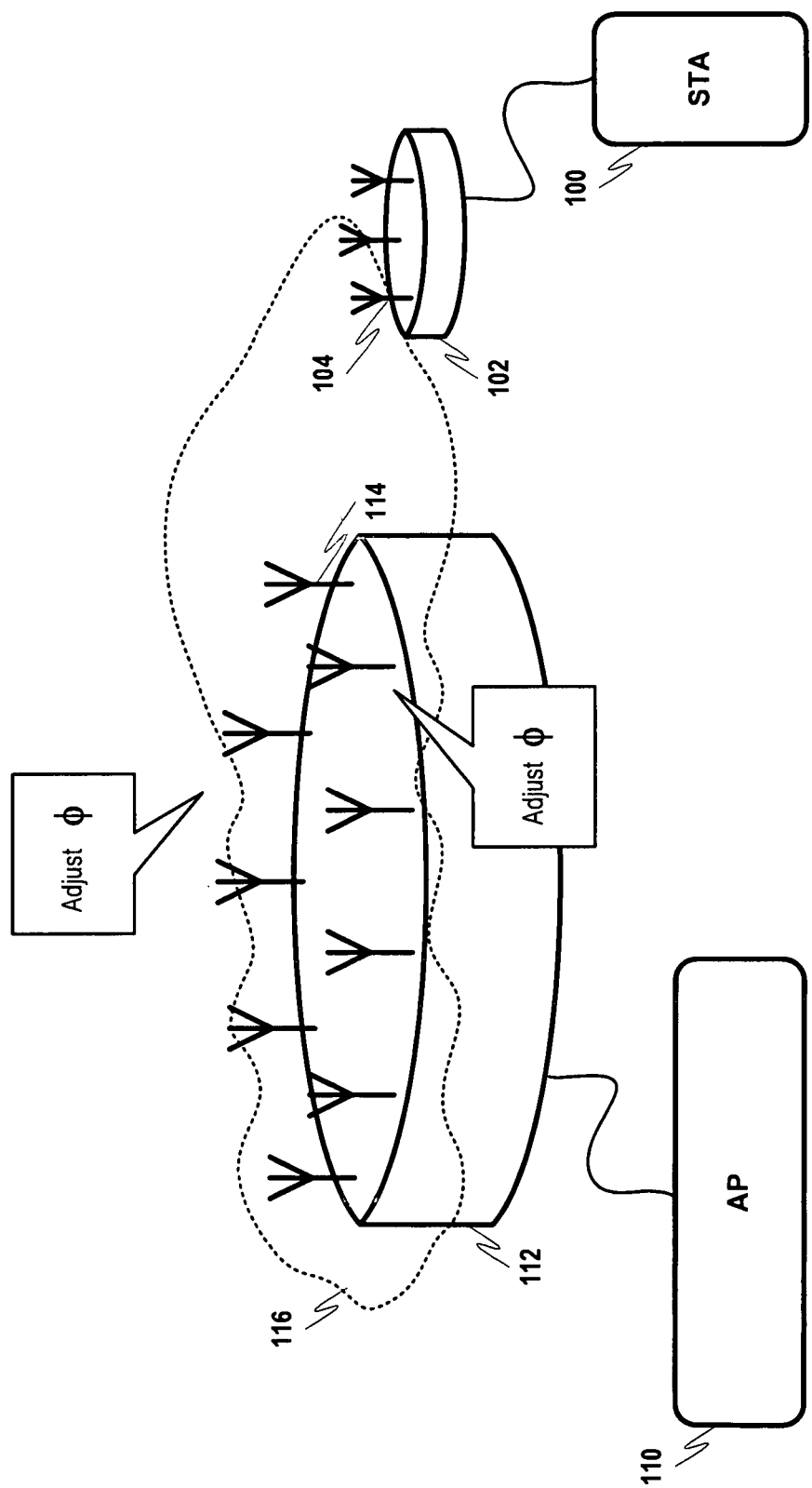
FIG. 2 discloses an example of beam forming by adjusting the phase of an antenna system in accordance with at least one embodiment of the present invention.

In accordance with at least one example embodiment of the present invention, the transmission of training signals from the centralized AP may be facilitated to assist the beamforming capable stations for directional beam steering and selection. To increase the range of coverage, 60 GHz wireless local area network (WLAN) API 110 and STA may be equipped with multi-element antenna systems with beam steering control mechanisms, an example of which is shown in FIG. 2. High directional antenna gains at both ends may be utilized to overcome the substantial path loss common in mmWave band. Due to smaller wavelength (5 mm in 60 GHz), it is possible to integrate a large number antenna elements, in a linear or planar array configuration, in a smaller area integrated to the RF front end. As shown in FIG. 2, one or more antennas in an antenna system may be adjusted to create constructive interference between signals emitted from these antennas. The constructive interference may result in a new waveform having the combined amplitude of the original waves in a particular direction (for example, as shown at 116 in FIG. 2) that forms a communication "beam" in that direction.

III. Beam Training

Figure 3:
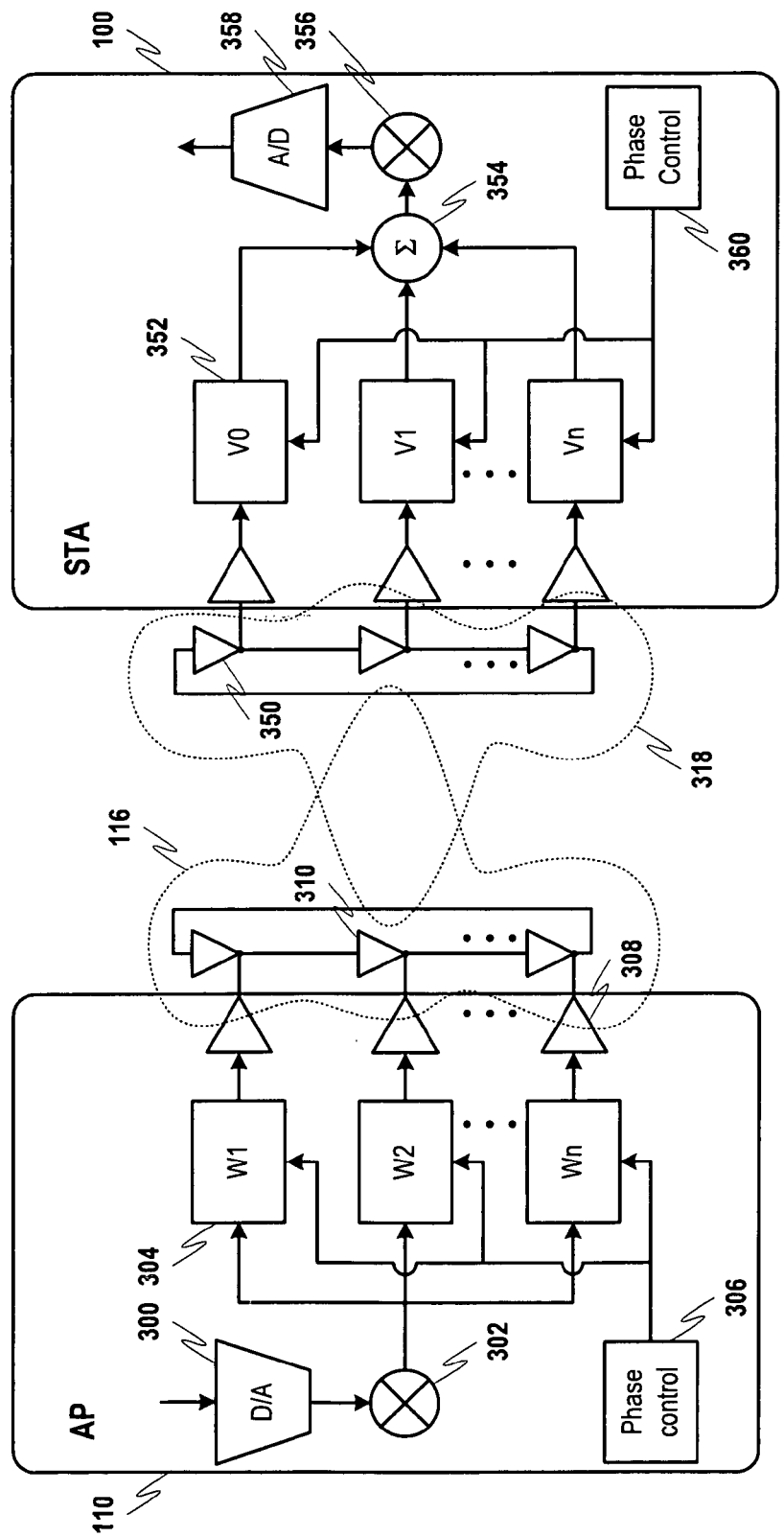
FIG. 3 discloses an example of apparatus interaction including adjustable antenna systems in accordance with at least one embodiment of the present invention.

An example of a system for configuring a communication beam is disclosed in FIG. 3. Digital information in AP 110 may be converted to analog signal information in digital to analog converter (D/A) 300. The analog signal information from D/A 300 may be combined into an analog signal for transmission in summing element 302. In array beamforming, the phases of the feed input signals to multiple antenna elements are controlled using a predefined weight vector w (as shown at 304) and at the transmitter and v (as shown at 352) at the receiver. Phase controls 306 and 360 may adjust the gain vectors 304 and 206 to maximize antenna gains towards the desired direction of transmission and reception.

The analog signal may then be sent from antenna elements 310 to antenna element 350. As shown in FIG. 3, various embodiments of the present invention may use beam training to direct signals 116 and 318 in a particular direction in order to maximize the quality of the signal. The signal information may then be summed and combined by elements 354 and 356 in STA 100, the resulting analog information being converted back into digital information for use by STA 100 by analog to digital converter (A/D) 358. The transmission energy may be focused to line of sight or stronger reflection paths, whereas, other multipaths become attenuated. The set of beamforming vectors used depends on the array geometry such as linear, circular or planar arrays and the desired beam direction. For practical implementations, beam switching by integrated RF phase shifters may be used in mmWave band. For example, phased arrays may be designed to include beamforming control resources that are configured to steer the beams from a set of multiple fixed beams. Such open loop schemes may be attractive for implementation in 60 GHz WLAN systems due to their simplicity and low-cost. These benefits may be realized since the feedback of channel information from the receiver will not be required.

Before AP 110 and STA 100 may start transmitting data in accordance with a directional communication beam, the highest quality transmit and receive beam directions have to be estimated during an initial training phase. Example configurations in accordance with at least one embodiment of the present invention are described below.

IV. Example Operational Embodiments

In accordance with at least one example embodiment of the present invention, an example configuration is utilized for the sake of explanation. A WLAN basic service set (BSS) may consist of AP 110 capable of forming fixed beams towards a fixed number of beam pointing directions. In some cases, AP 110 can generate large beam widths covering a sector, wherein sectors may comprise multiple smaller beams over the azimuthal angular span of the sector. The channel access mechanism in the BSS is carrier sense multiple access with collision avoidance (CSMA/CA). AP 110 can reserve the medium by setting the network allocation vector (NAV) to be large enough to allow for beam-training. In addition, training PPDUs, or training packets, also indicate the length of the training period in a signaling field so that stations operating in a directional receive mode can determine the length of ongoing beam training period. Transmission and reception by a station in WLAN may be done in time division duplex (TDD) mode, and reciprocity of the downlink and uplink channels are assumed. Training PPDUs are transmitted from AP 110 to the stations, which may use any scheme (for example, manual/semi-automatic or adaptive methods) to assess the desired direction for beam reception and transmissions.

To facilitate detection, the number of beam training PPDUs required by STA 100 may be communicated through beam forming capability information during association/re-association signaling. For transmission of the beacon and some management frames, a robust omni-directional signal bearer (OSB) may be available that may cover the transmission range over the BSS. The OSB can be realized by using a very low modulation order and coding rate together with high spreading rate to assist during beaconing, associations, probe request/response, medium reservations and initiation of beam-steered transmissions for stations in the BSS.

V. Beam Training

Beam selection training sequences (BSTS) may be scheduled or unscheduled. During the training phase, participating stations may receive the beam training PPDUs (referred to herein as BTPs) and may record the signal quality for different beams. The number of BTPs transmitted during training sequences can vary, but should at least be sufficient to adaptively compute a beam steering vector, or to allow manual, semi-automatic or automatic steering towards different receiving directions. The only indication that may be required from STA 100 for its internal beam acquisition method is the minimum number of BTPs per beam training sequence communicated to AP 110, for example, in the beam forming capability information field. Since multiple STA 100 can simultaneously receive and utilize the same beam training signal, the training overhead may be reduced. The exchange of signal information for supporting beam selection training may operate asymmetrically. For example, BTPs from AP 110 may be transmitted in a single transmission opportunity (TXOP) period, but testing, acknowledgement and initiation of communication in STA 100 based on the results of beam training may occur in subsequent TXOP periods when STA 100 and AP 110 are allocated at least one time period during which channel access is allowed.

For instance, AP 110 may announce beam training schedules for the beams that it supports in accordance with the interference protection provided by a CSMA/CA contention-based initiation channel. Due to the flexibility of allowing the beam reception, testing and initiation steps of beam-steered transmissions to occur during different TXOP periods, the training and associated signaling overhead may be significantly reduced.

Beam training schedule information, along with other related parameters, may be included in a beam training information element (BTIE) transmitted as part of a beacon frame, or any other frames, after which beam-training will follow. Algorithms governing how STAs 100 may steer its beams based on received BSTS may be implementation specific. STAs 100 may use manual, semi-automatic or adaptive tracking select a reception beam.

Figure 4:
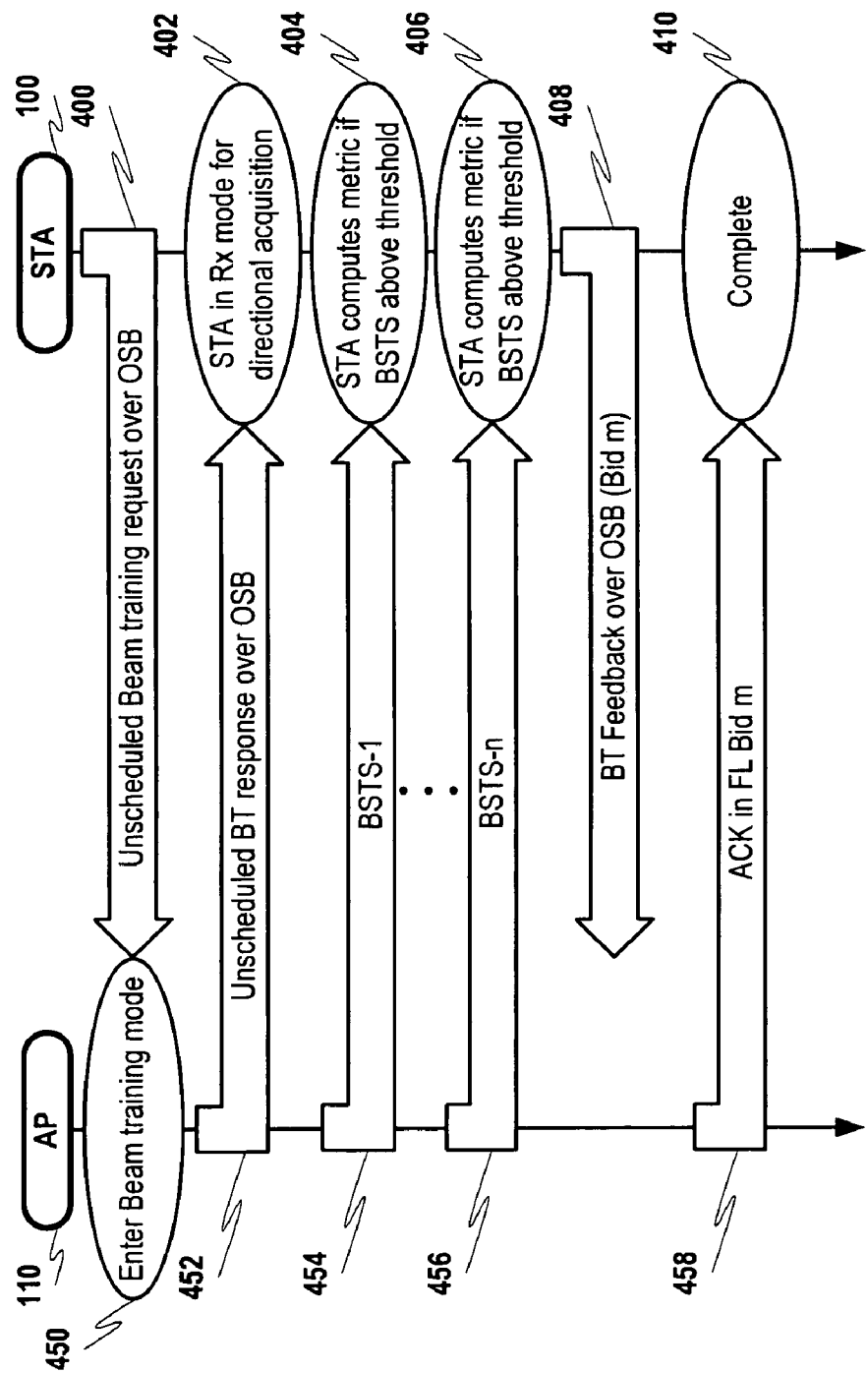
FIG. 4 discloses an example of a stepwise beam training interaction usable in accordance with various embodiments of the present invention.

An example of unscheduled beam training between two apparatuses is disclosed in FIG. 4. In accordance with at least one example embodiment of the present invention, an unscheduled beam training request may be sent from STA 100 to AP 110 at 400. STA 100 may be permitted to access the communication medium upon Clear Channel Assessment (CCA) and/or NAV expiry, and may then transmit its request for the initiation of unscheduled beam training using an unscheduled beam-training request management frame over a robust omni-directional signal bearer. This message frame may include an unscheduled beam training information element (BTIE) comprising, but not limited to, the following parameters: minimum number of BTP per BSTS required for its internal beam acquisition; preferred training mode—all BSTS first mode or feedback per BSTS mode; and a beam training map comprising a list of downlink beam IDs requested for BSTS.

When operating in an unscheduled BSTS feedback mode, AP 110 may wait in receive mode in that beam direction until feedback is received from the STA 100. When STA 100 has already acquired BSTS of some DL beam ID set, but is experiencing high packet loss in directional transmissions when using this particular beam ID, STA 100 can send a beam training map containing the list of downlink beam IDs requested for beam selection training, which can also be used for beam-tracking. When AP 110 can grant a request immediately (for example, enter a beam training mode shown at 450), it may acknowledge the request with an message like an unscheduled beam-training response frame in OSB with the immediate BT field set to "true" at 452. By setting the duration of the frame, AP 110 may reserve necessary time for the transmission of a BSTS to follow the current frame. In order to communicate relevant parameters to STA 100, a response frame may also contain a BT IE field. In certain instances, AP 110 may delay a beam training request, or may not support a requested BT request, due to its inability to support the parameters requested for training. AP 110 may then respond with setting the immediate BT field of the IE to "false" along with an associated reason code for the cause.

Following the granting of beam training for STA 100, AP 110 may start transmitting beam training sequences for its supported DL beam IDs (shown, for example, at 454-456). Transmissions may depend on the requested method (for example, feedback mode). Also, when the request was over a fixed set of beam IDs, the AP will only transmit the requested beam IDs. At the beginning of a beam training period, each beam-receive capable station may enter a receive mode as shown at 402 and may start the process of beam acquisition (404-406). Different receiving apparatuses may utilize different algorithms to detect the beam signal and compute the received signal quality. For signal quality assessment (SQA), STA 100 can utilize methods such as: (1) receiving multiple BTPs from AP 110 during which STA 100 can switch its receive beam directions to detect best direction; (2) using received BTPs to estimate a direction of arrival for the BTPs, which may indicate the best direction, or alternatively, STA 100 may adaptively track a beamforming weight vector.

Using a BSTS feedback mode, STA 100 may send feedback to the AP in signaling messages like "BT feedback" frames using, for example, a robust omni-directional signal bearer after the end of the training phase as shown at 408. This feedback may indicate the best beam ID for its reception along with other parameters. AP 110 may respond with a directional ACK frame by its beam steered to the requested beam as shown at 458. Under beam training using feedback per BSTS mode, STA 100 will switch to transmit mode at end of each BSTS if it was able to receive the sequence and transmits "BT feedback" frame over its best direction. If AP 110 receives the frame while receiving in the same direction of its sequence transmission, may record it as one successful DL beam ID for STA 110. After a predetermined number of BSTSs, STA 100 may be already satisfied with the current signal quality assessment (SQA) above certain threshold for one or more beam directions from AP 110, and it may indicate termination of beam training. AP 110 may first send a directional ACK frame to the STA 100 and then release the NAV reservation by transmitting contention free end frame after such request. The beam training process may then conclude as shown at 410.

Depending on settings in AP 110, in certain cases STA 100 may implicitly indicate an unscheduled beam training request when sending the association request with beam steering capability, or AP 110 may automatically proceed with an initial unscheduled beam training response frame after the association response. However, the process may continue in same manner as described above. The unscheduled beam training process may also be used for beam tracking. In this instance, STA 100 may explicitly indicate the group of beam IDs for which it wants to receive training sequences. The decision of STA to request beam training can be based on received SNR level, when the SNR is below some threshold or based on retransmission rate for packets.

The example beam training method disclosed above may be utilized in a WLAN BSS. If stations want to request specific training signals from an AP, an unscheduled request may be used. In at least one configuration, support for scheduled beam-training may be made mandatory in an AP for initially providing coarse level, or sector level, training. This may help stations learn the best sector direction towards the AP. Unscheduled training may then used for fine training and beam tracking within only 1 or 2 sectors of interest.

VII. Example Beam Training Facilitation

Figure 5:
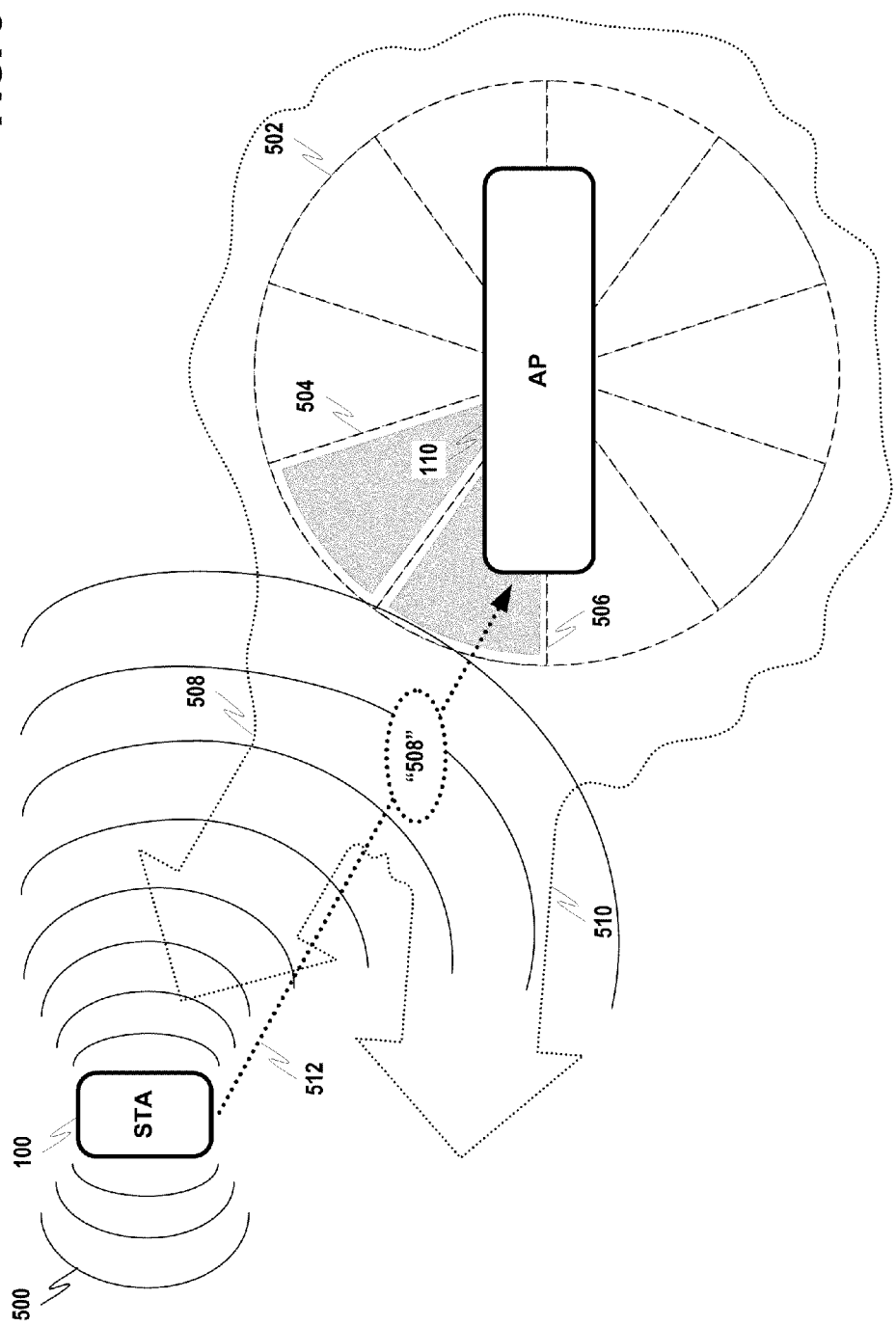
FIG. 5 discloses an example of apparatus interaction in accordance with at least one embodiment of the present invention.

In FIG. 5 an example wireless interaction involving STA 100 and API 110 is disclosed. While these apparatuses have been depicted in certain configurations, the various implementations of the present invention are not specifically limited to devices acting in these roles, and may utilize any apparatuses that are enabled for wireless communication including at least some directional functionality.

The explanation of the example shown in FIG. 5 will further refer to both a complete set of communication signals and a reduced set of communication signals. The characterizations of these signals, as presented herein, are made only for the sake of clarifying the explanation by distinguishing between communication signals that are transmitted in directions that are undefined, for example by some sort of directional control and signals that, based on the configuration of the sending apparatus (for example, in particular the antenna unit and related support components) are focused in a particular direction by some sort of directional control. Thus, the implementation shown in FIG. 5 is not intended to be limiting.

Now referring to FIG. 5, STA 100 represents an apparatus that has a communication requirement. The source of this communication requirement may be attributed to various activities that may occur in the apparatus, such as the activation or manipulation of software programs on the apparatus, general user interaction, device utilities, inquiries from other apparatuses, or the like. The type of communication requirement may further dictate the most appropriate mode of communication. For example, transactions that require high speed or a substantial amount of data transfer may be best suited for wireless communication having higher bandwidth, such as VHT WLAN. As this type of communication may be effective when conducted using directionally focused signals, a process that facilitates the configuration of directional links may be needed.

In accordance with at least one example embodiment of the present invention, STA 100 may initially seek out other apparatuses that can potentially fulfill the communication requirement. Towards this end, STA 100 may transmit signal 500. Non-directional transmission may be employed to account for situations where STA 100 may be unaware of one or more proximately-located devices, or any available networks, that are able to provide the resources required by STA 100, as well as the respective locations of these apparatuses. Signal 500 may, for example, be based on active scanning by sending a probe request frame, and may indicate the service or information that is required. It may further contain a request for beam training. This transmission may therefore serve two purposes by locating other apparatuses that have the desired information and/or service, and also the capability to operate using a mode of wireless communication preferred by STA 100.

AP 110, or other stations that may be able to provide the required resource, may receive request message 500. If after accessing the content of signal 500 AP 110 determines it can provide the required resource via a directional mode of wireless communication, AP 110 may perform a directional determination as shown at 502 in order to estimate the position of the source of the request message signal. The estimation may be made using, for example, a direction-of arrival determination. The accuracy of the estimate may vary depending on a number of factors including, the number of antennas in the antenna array of AP 110, the amount of interference present in the operating environment, the strength of the beam training request signal, and/or the like. These factors may initially be utilized in making determining whether the quality of the signal is sufficient for making a directional estimate. More specifically, influences like distance, low transmission power and interference may cause the beam training request signal to degrade to a point where the accuracy of the estimate would be extremely questionable.

In example situations where signal 500 may be deemed sufficient for use in directional estimation, one or more possible directions may be identified based on the resolution of direction-finding in AP 110. In this example, AP 110 determines that STA may fall within one of two directional regions 504 and 506. AP 110 may then transmit a two part response. Initially, a response message may be transmitted in a non-directional manner, the response message informing STA 100 about the type of beam training that will follow. For example, the information in the message responding to STA 100 may comprise at least configuration information that may be utilized by STA 100 in order to enter a beam training mode appropriate for type of beam training that will be conducted by AP 110. Configuration information may include, for example, indication pertaining to whether AP 110 will implement a beam training process using a complete set of training beams (for example, a set of beams corresponding to all of the transmission directions supported by AP 110) or a beam training process having a reduced number of training beams (for example, corresponding to the directions in which the requesting apparatus is believed to reside). Examples of information that may be included in a response message that signals the use of a focused process will be discussed with respect to FIG. 6.

As potential directions 504 and 506 have been reliably identified from the supported directions by AP 110, a reduced set of communication beams may be utilized in any subsequent beam training processes. This may be indicated to STA 100 in the form of an non-directional or directional response message (not shown), which may be followed by one or more reduced beam training sequences as shown at 508 and 510. These beam training sequences may be "reduced" because they are limited to directions that may correspond to direction-of-arrival estimations 504 and 506, respectively. Station 100 may receive the initial response message, understand from the content of this message what type of training will follow including, for example, the identification of each training sequence, the number of beams in each training sequence, the number of sequences, or the like. As further shown in the example of FIG. 8, STA 100 may receive training sequence 508, or may receive both training sequences but may determine that training sequence 508 is the more accurate direction (for example, stronger signal, a higher quality signal, or the like).

STA 100 may then transmit a signaling message 812 to AP 110. In at least one example implementation, the signaling message may be transmitted as a part of a request for more substantial interaction (for example, communication to provide access to the resource required by STA 100), and may identify the selected training sequence (for example, "508"). AP 110, aware of the identification corresponding to each training sequence, may identify the direction of the selected training sequence as the preferred communication beam to utilize when communicating with STA 100. The apparatuses may then enter into directional communication in accordance with the selected beam.

Figure 6:
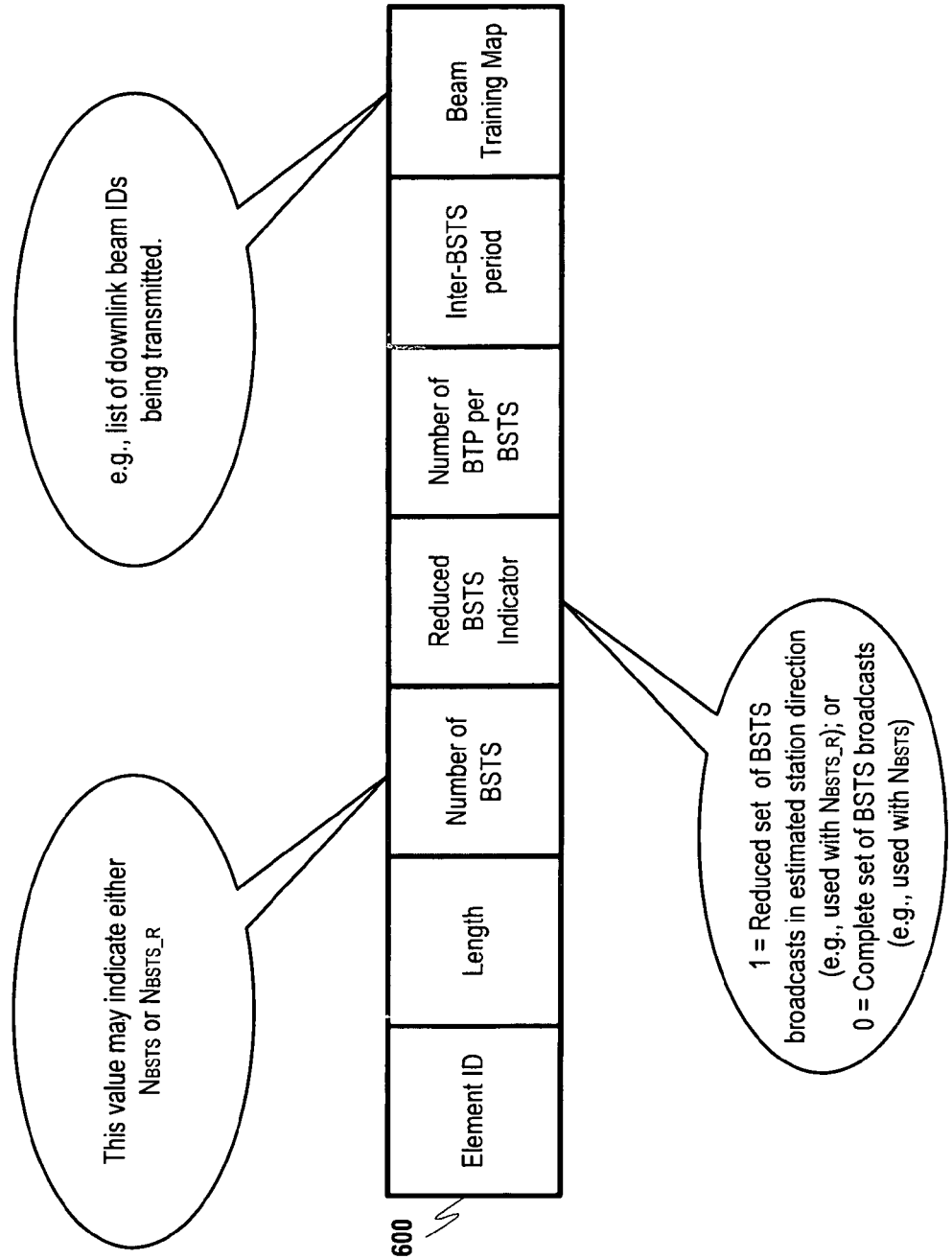
FIG. 6 discloses an example of a response message usable in accordance with at least one embodiment of the present invention.

FIG. 6 discloses an example response message 600 that may be utilized in accordance with various example implementations of the present invention. Response message 600 may be transmitted in response to a request for communication message, for example, after the apparatus that received the communication request determines whether beam training can be implemented and the type of beam training that may be conducted (for example, after a determination is made as to the quality of the communication request signal and/or the resulting direction-of-arrival estimation). Response message 600 may be transmitted via non-directional or directional communication. For example, beam training using a complete set of beams may be implemented if the signal quality is determined to be unsuitable for formulating a reliable direction-of-arrival estimate. Alternatively, a reduced beam training set may be utilized if the direction-of-arrival is deemed acceptable. Information included in response message 600 may comprise, but is not limited to, information such as element ID (for example, identifying the type of message), length, number of beam selection training sequences (BSTS), indication that a reduced BSTS training sequence will be sent, a number of beams (BTP) sent per BSTS, an inter-BSTS period and/or a beam training map.

At least one advantage of utilizing a reduced beam training set is that resource consumption in both the transmitting and receiving apparatuses may likewise be reduced. Further, fewer beam training sequences may be needed to determine a preferred communication beam since an estimated location for each requesting apparatus is known (for example, by performing a direction-of-arrival determination using the request signal), and thus, a complete beam training sequence need not be sent in order to account for all possible locations of the requesting apparatuses. As a result, preferred communication beams may be determined more rapidly, allowing for faster commencement of directional communication, which along with communication speed may improve overall QoS.

Certain combinations of the above information may be utilized inform an apparatus that is requesting communication (for example, STA 100) of the availability of beam training and the beam training sequences to expect from a beam training source (for example, AP 110). In accordance with at least one example embodiment of the present invention, the number of BSTS may correspond to a value indicating a complete set of BSTS (for example, beams transmitted in all communication directions that are supported by a source apparatus, or $N_{BSTS}$), or a reduced set (for example, a reduced number of beams transmitted in one or more directions corresponding to a directional estimation, or $N_{BSTS\_R}$). For example, $N_{BSTS}$ may correspond to a number of beam-training sequences that are expected when the location of requesting apparatuses is unknown, while $N_{BSTS\_R}$ may be a reduced number of beam training sequences that are expected to achieve the same result when the location of the requesting apparatus can be reliably estimated.

Moreover, when the number of BSTS=$N_{BSTS\_R}$, the reduced BSTS indicator may inform the receiving apparatus that a reduced set of training sequences will be sent (for example, with an indicator of "1"). Alternatively, setting the indicator to "0" may signify that a complete set will be sent including, for example, at least one communication beam in each supported direction (for example, $N_{BSTS}$). STA 100 may utilize this information to alter behavior (for example, set a mode) with respect to the received training sequences. For example, STA 100 may interact differently (for example, different messages may be exchanged, messages may be exchanged at different time, timeouts may change, or the like) if the beam training set is reduced, as opposed to the complete process. STA 100 may further utilize the beam training map, which may comprise a list of downlink beam IDs, in order to identify preferred communication beams. A downlink beam ID for one or more preferred communication beams may be included in a signaling message that is sent back to AP 110 so that both apparatuses may be aware of preferred directions in which to aim communication signals when establishing links using directional communication.

VIII. Process Examples

Figure 7:
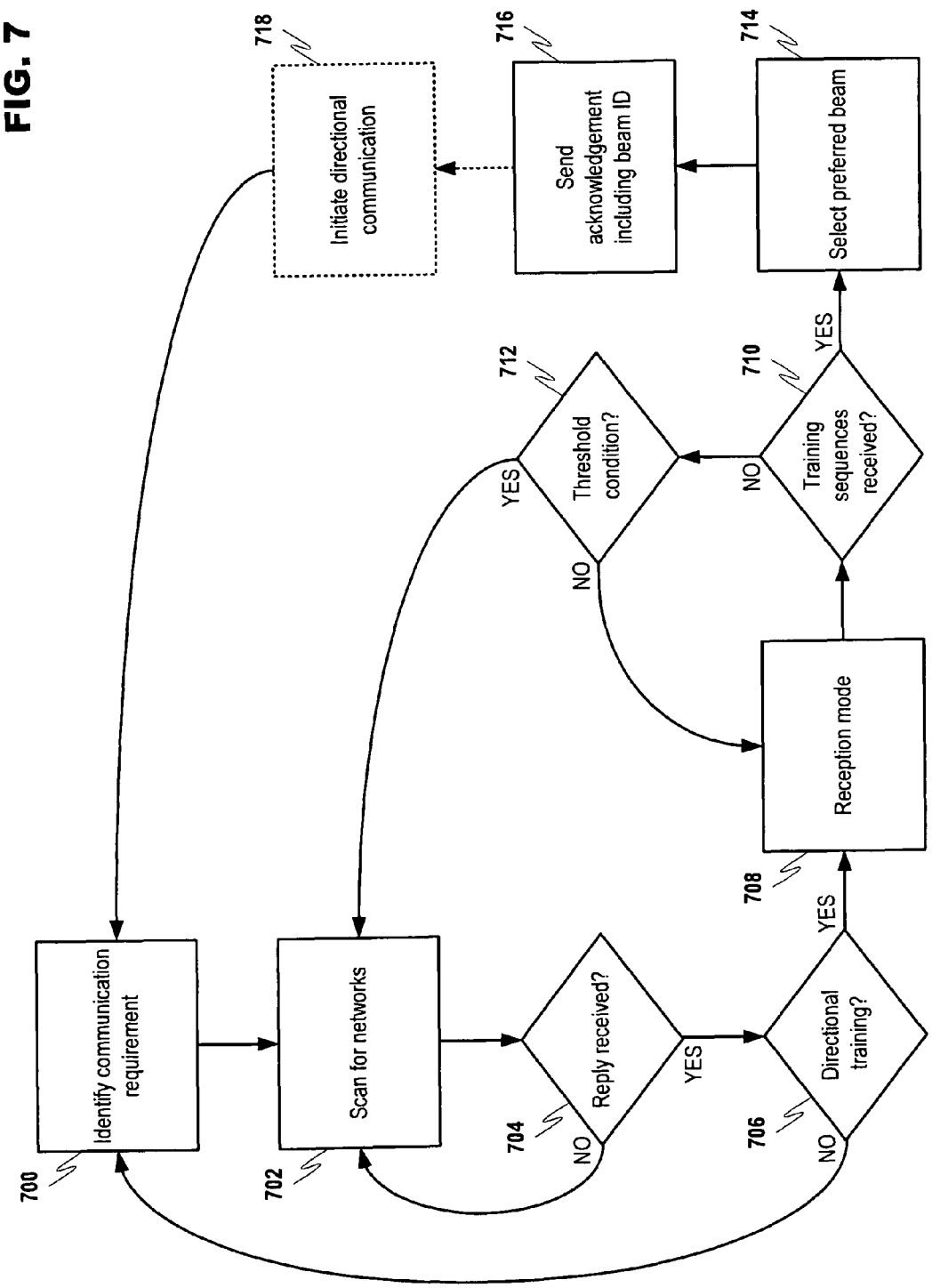
FIG. 7 discloses a flowchart of an example beam training facilitation process from the perspective of a searching apparatus in accordance with at least one embodiment of the present invention.
Figure 8:
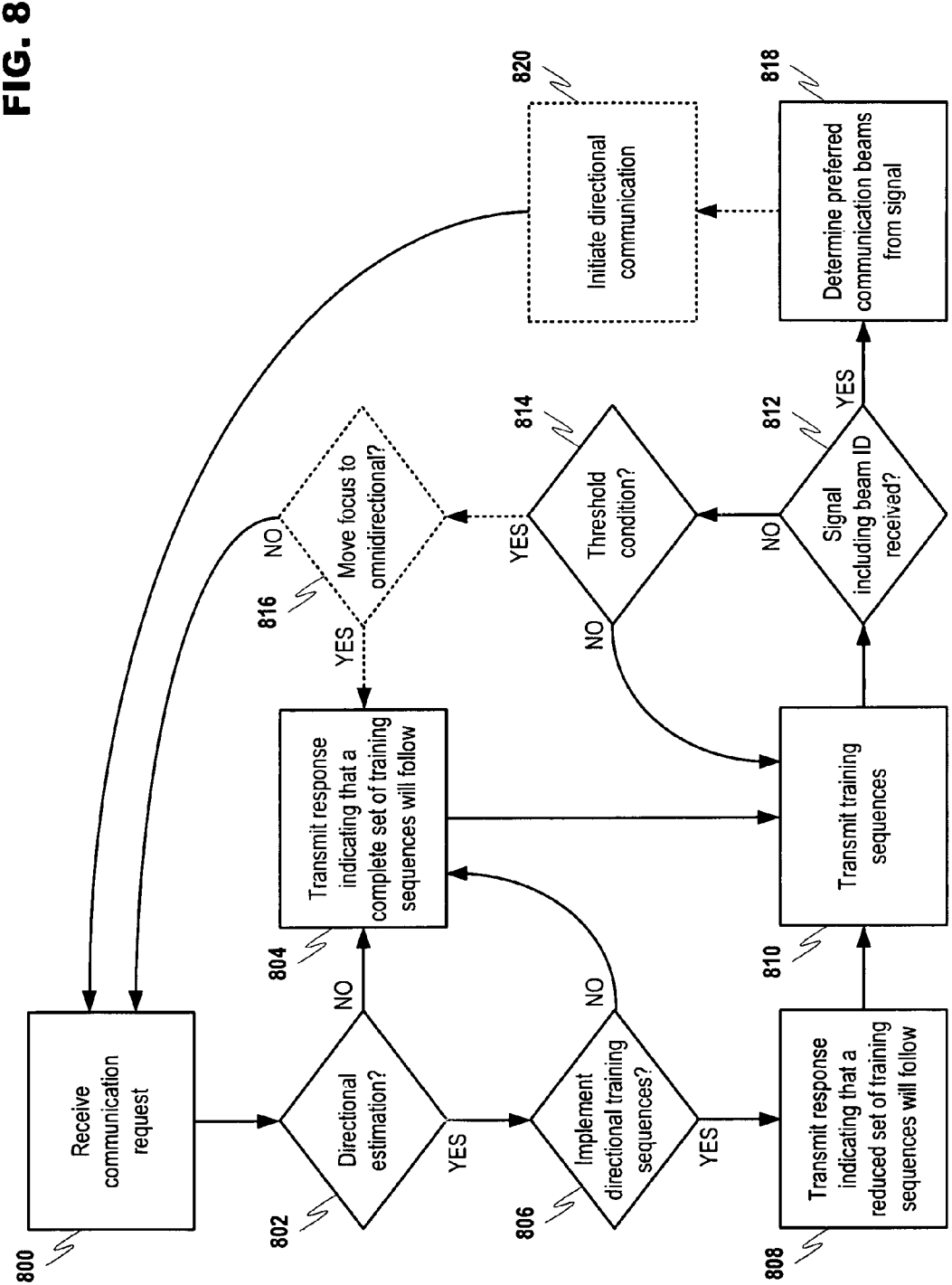
FIG. 8 discloses a flowchart of an example beam training facilitation process from the perspective of another apparatus in accordance with at least one embodiment of the present invention.

In accordance with various example embodiments of the present invention FIG. 7 and FIG. 8 disclose process examples for beam training from the perspective of a requesting apparatus (for example, STA 100) and a training apparatus (for example, AP 110), respectively. Initially, an apparatus in FIG. 7 may identify a communication requirement in step 700. The communication requirement may stem from activities occurring in the apparatus that require access to resources (for example, services and/or data) residing in at least one other apparatus. The apparatus may then scan for networks in step 702, which may in turn contain devices having the needed resources. The scan may comprise, for example, the transmission of signals containing at least a message requesting communication with another apparatus. Request messages may further include identification of the resources required by the apparatus.

The apparatus may continue transmission of the request message in step 702 until a reply is received in step 704. The apparatus may then access the content of the reply message to determine, for example, if directional communication is supported in the network in step 706. For example, the content of the response message may indicate that directional communication is available (preferred, required, etc.) and that a complete set of training sequences will be sent. Alternatively, the response message may indicate that a reduced set of training sequences will be sent (for example, sequences sent in a particular direction based on, for example, a direction-of-arrival determination performed in the providing apparatus). If in step 706 the reply message does not indicate that directional training will commence, then the process may return to step 700 to await the next communication requirement. Otherwise, in step 708 the apparatus may enter a reception mode in accordance with the information contained in the response message, (for example, indicating a complete or reduced training set). This mode may continue until the expected number of training sequences has been received. If the expected number of training sequences is not received in step 710, or if the training sequence was determined to be corrupt, then in step 712 a determination may be made as to whether a threshold condition exists. A threshold condition may be, for example, a timeout set in the apparatus, a duration since the previous training sequence was received, a number of bad training sequences, or the like. If the threshold condition has not been exceeded in step 712, then the apparatus may continue to wait for additional training sequences in step 708. Otherwise, it may be possible that something has happened to the apparatus that was providing the training sequences (for example, a communication failure, the device has moved out of range, or the like). In such an instance the process may return to step 702 to rescan for apparatuses (for example, to scan for the same apparatus or another apparatus that can provide the same functionality).

If the previously specified number of training sequences has been received in the apparatus, the apparatus may perform beam training in step 714. This process may include the evaluation of all received beam training sequences in order to determine, for example, the strongest signal that was received. The apparatus may then select one or more beams by identifying a corresponding downlink beam ID (for example, provided as part of the response message), and may advise the providing apparatus of the selected communication beam by including the downlink beam ID in a signaling message sent in step 716. The signaling message may be sent immediately, later, or may occur along with optional step 718, wherein the apparatus may engage in directional communication with the apparatus that providing beam training. Communication may be established by sending a request message in the preferred beam direction using directional transmission. The process may then return to step 700 to await the next requirement for beam training.

FIG. 8 discloses an example of the process of FIG. 7 from the perspective of the apparatus that provides beam training in response to a request (for example, AP 110). In accordance with at least one example embodiment of the present invention, a communication request may be received in step 800. A determination as to whether to engage in a directional estimation utilizing the received response signal may then be made in step 802. This determination may include, for example, an initial determination as to whether the quality of the receiving signal is sufficient enough to use for estimation. If the quality is of the received request signal is deemed insufficient, or if other problems occur that prevent usage of the estimation per step 806, then in step 804 a response may be transmitted that indicates that a complete set of training sequences will be utilized transmitted following the response message. The process may then proceed to step 810 for the transmission of a complete sequence of training sets. Alternatively, in step 808 the message may instead indicate that a reduced set of beam training sequences will be transmitted. In a manner similar to the above, a response may be transmitted to the requesting apparatus including values/indicators that the requesting apparatus may interpret in order to enter a mode suitable for directional beam training. For example, the response message may include a number of beam training sequences that will follow the response message. Again, the process may then move to step 810 for beam transmission.

In step 810 the number of training sequences identified in step 808 may be transmitted to the requesting apparatus. A determination may be made in steps 812-814 as to whether the requesting apparatus has selected one or more preferred communication beams before a threshold condition is exceeded. Selecting one or more preferred beams may occur via signal messages identifying at least one beam ID. Threshold conditions may include temporal values such as timeouts or duration, a number of retransmissions with no acknowledgement being received, or the like. The threshold may further allow time for the requesting apparatus to send the signaling message at the time when more substantial communication with the apparatus is desired. In this way retransmission of training sequences may continue until a signal is received or a threshold condition is met.

In an optional process step, if beam training using a reduced set was still unsuccessful when a threshold condition is met, then in step 816 a response signal initiating beam training with a complete beam training set may be transmitted. This provision may account for the instance wherein the direction-of-arrival estimation is incorrect, or the reduced number of training sets does not allow the requesting apparatus to select at least one preferred communication beam. If beam training utilizing a complete beam sequence was already attempted prior to arriving at step 816, then the beam training process may abort and reinitiate at 800 with the next received request.

If the training sequences are transmitted in step 810, and a signaling message is received selecting one or more preferred communication beams is received, then the process may proceed to step 818. In this step the apparatus that provided beam training may determined the one or more preferred communication beams based on the beam IDs contained in the signaling messages. As a result, both apparatuses may be aware of the preferred communication beam to utilize during interaction. For example, the apparatus that provided beam training may, in some instances, initiate communication with the apparatus that requested beam training in step 820. For example, the apparatus that provided beam training may have services and/or data that are required by the requesting apparatus, and therefore, the providing apparatus may initiate communication in step 820 in order to provide access to these resources. The process may then reinitiate at step 800 to await communication from other apparatuses requesting communication.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
identifying a communication requirement in an apparatus;
discovering wireless networks in communication range of the apparatus using at least one request message transmitted from the apparatus;
receiving a message at the apparatus, the message containing configuration information in response to the at least one request message, the configuration information indicating at least a reduced number of communication beam training sequences that will be transmitted following the received message;
receiving the communication beam training sequences at the apparatus; and
selecting at least one preferred communication beam from the communication beam training sequences received at the apparatus using a training process based on the configuration information.

2. The method of claim 1, wherein the request message explicitly requests a beam training sequence.

3. The method of claim 1, wherein the response message is dedicated to informing receiving apparatuses of information about one or more communication beam training sequences that will follow the response message.

4. The method of claim 1, wherein the configuration information instead indicates that a complete set of communication beam training sequences will be sent.

5. The method of claim 1, further comprising transmitting a signaling message identifying the at least the one preferred communication beam.

6. A method, comprising:
receiving a message at an apparatus, the message requesting communication;

estimating the direction from which the wireless signal that carried the request message arrived at the apparatus;

if the estimation is determined to be acceptable by the apparatus, transmitting a response message from the apparatus, the response message containing configuration information indicating at least a reduced number of communication beam training sequences that will be transmitted from the apparatus following the response message;

transmitting the reduced number of communication beam training sequences indicated in the configuration information from the apparatus;

receiving a signaling message at the apparatus, the signaling message identifying at least one preferred communication beam; and responding to the signaling message by transmitting a directional message from the apparatus in accordance with the preferred communication beam.

7. The method of claim 6, wherein the estimate is acceptable if the wireless signal that carried the request message satisfies a required quality level.

8. The method of claim 6, wherein the configuration information instead indicates that a complete set of communication beam training sequences will be sent.

9. A computer program product comprising computer executable program code recorded on a computer readable medium, comprising:

computer executable program code configured to identify a communication requirement in an apparatus;

computer executable program code configured to discover wireless networks in communication range of the apparatus using at least one request message transmitted from the apparatus;

computer executable program code configured to receive a message at the apparatus, the message containing configuration information in response to the at least one request message, the configuration information indicating at least a reduced number of communication beam training sequences that will be transmitted following the received message;

computer executable program code configured to receive the communication beam training sequences at the apparatus; and computer executable program code configured to select at least one preferred communication beam from the communication beam training sequences received at the apparatus using a training process based on the configuration information.

10. A computer program product comprising computer executable program code recorded on a computer readable medium, comprising:

computer executable program code configured to receive a message at an apparatus, the message requesting communication;

computer executable program code configured to estimate the direction from which the wireless signal that carried the request message arrived at the apparatus;

computer executable program code configured to, if the estimation is determined to be acceptable by the apparatus, transmit a response message from the apparatus, the response message containing configuration information indicating at least a reduced number of communication beam training sequences that will be transmitted from the apparatus following the response message;

computer executable program code configured to transmit the reduced number of communication beam training sequences indicated in the configuration information from the apparatus;

computer executable program code configured to receive a signaling message at the apparatus, the signaling message identifying at least one preferred communication beam; and computer executable program code configured to respond to the signaling message by transmitting a directional message from the apparatus in accordance with the preferred communication beam.

11. An apparatus, comprising:

a processor, the processor being configured to:
 identify a communication requirement;
 discover wireless networks in communication range using at least one request message;
 receive a message containing configuration information in response to the at least one request message, the configuration information indicating at least a reduced number of communication beam training sequences that will be transmitted following the received message;
 receive the communication beam training sequences; and
 select at least one preferred communication beam from the received communication beam training sequences using a training process based on the configuration information.

12. The apparatus of claim 11, wherein the request message explicitly requests a beam training sequence.

13. The apparatus of claim 11, wherein the response message is dedicated to informing receiving apparatuses of information about one or more communication beam training sequences that will follow the response message.

14. The apparatus of claim 11, wherein the configuration information instead indicates that a complete set of communication beam training sequences will be sent.

15. The apparatus of claim 11, further comprising transmitting a signaling message identifying the at least the one preferred communication beam.

16. An apparatus, comprising:

a processor, the processor being configured to:
 receive a message requesting communication;
 estimate the direction from which the wireless signal that carried the request message arrived;
 if the estimation is acceptable, transmit a response message containing configuration information indicating at least a reduced number of communication beam training sequences that will be transmitted following the response message;
 transmit the reduced number of communication beam training sequences indicated in the configuration information;
 receive a signaling message identifying at least one preferred communication beam; and
 respond to the receiving message by transmitting a directional message in accordance with the preferred communication beam.

17. The apparatus of claim 16, wherein the estimate is acceptable if the wireless signal that carried the request message satisfies a required quality level.

18. The apparatus of claim 16, wherein the configuration information instead indicates that a complete set of communication beam training sequences will be sent.

19. An apparatus, comprising:

means for identifying a communication requirement;

means for discovering wireless networks in communication range using at least one request message;

means for receiving a message containing configuration information in response to the at least one request message, the configuration information indicating at least a reduced number of communication beam training sequences that will be transmitted following the response message;

means for receiving the communication beam training sequences; and means for selecting at least one preferred communication beam from the received communication beam training sequences using a training process based on the configuration information.

20. An apparatus, comprising:

means for receiving a message requesting communication;

means for estimating the direction from which the wireless signal that carried the request message arrived;

means for, if the estimation is acceptable, transmitting a response message containing configuration information indicating at least a reduced number of communication beam training sequences that will be transmitted following the response message;

means for transmitting the reduced number of communication beam training sequences indicated in the configuration information;

means for receiving a signaling message identifying at least one preferred communication beam; and means for responding to the signaling message by transmitting a directional message in accordance with the preferred communication beam.

* * * * *

UNITED STATES PATENT AND TRADEMARK OFFICE
CERTIFICATE OF CORRECTION

PATENT NO. : 8,116,694 B2  
APPLICATION NO. : 12/343098  
DATED : February 14, 2012  
INVENTOR(S) : Kaaja et al.

Page 1 of 1

It is certified that error appears in the above-identified patent and that said Letters Patent is hereby corrected as shown below:

In Column 14

Line 55 (Claim 3), "wherein the response message" should read, --wherein the received message--;

Line 58, "follow the response message" should read, --follow the received message--.

In Column 16

Line 32 (claim 13), "wherein the response" should read, --wherein the received--;

Line 35, "follow the response message" should read, --follow the received message--.

Signed and Sealed this  
Fifteenth Day of May, 2012

David J. Kappos  
*Director of the United States Patent and Trademark Office*